Figure 1:
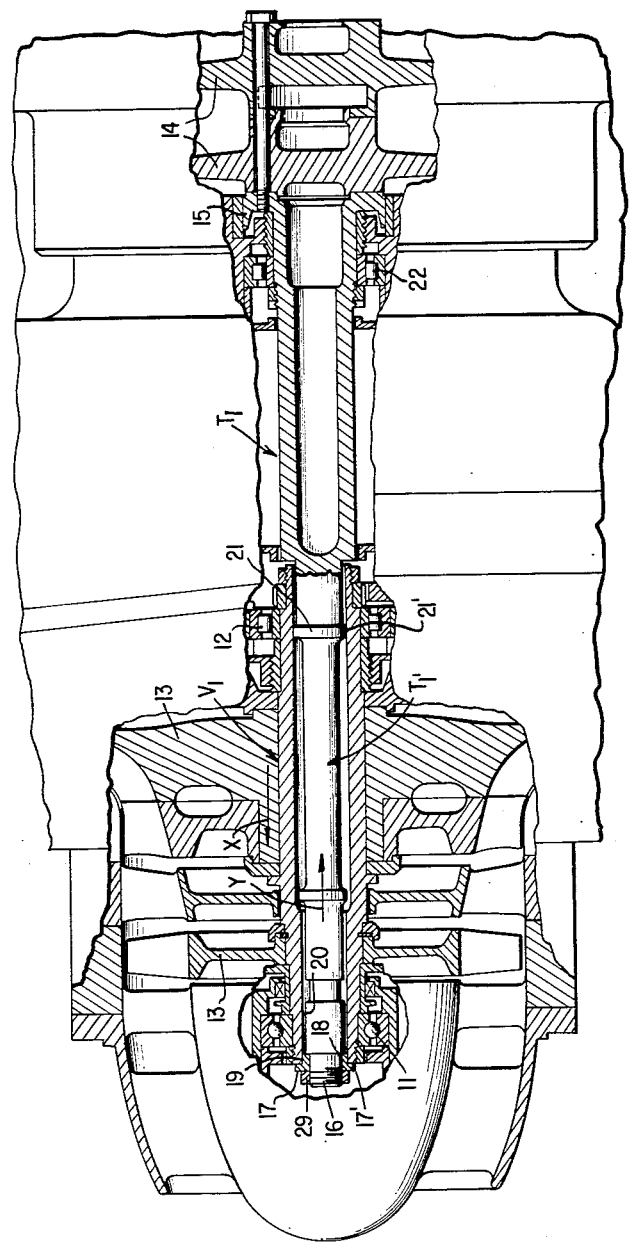

INVENTOR.
SIEGFRIED MAIER
BY Dick and Craig
ATTORNEYS.

INVENTOR.
SIEGFRIED MAIER
BY Dicke and Craig
ATTORNEYS.

United States Patent Office 3,134,535
Patented May 26, 1964

3,134,535
CONSTRUCTION AND ARRANGEMENT OF COMPRESSOR DRIVE SHAFTS IN GAS TURBINE PROPULSION UNITS
Siegfried Maier, Rommelshausen, Kreis Waiblingen, Germany, assignor to Daimler-Benz Aktiengesellschaft, Stuttgart-Unterturkheim, Germany
Filed Nov. 2, 1961, Ser. No. 149,728
Claims priority, application Germany Nov. 9, 1960
7 Claims. (Cl. 230—116)

The present invention relates to a construction and arrangement of the compressor drive shaft in gas turbine units which is supported in at least three bearings and which consists of two shaft parts detachably connected with one another, coupled in the direction of rotation, and centered with respect to each other, whereby one of the shaft parts is coordinated to the turbine rotor, while the other shaft part is coordinated to the compressor rotor, and both shafts are detachably connected with each other in the axial direction at the time of final assembly of the shaft.

It is generally known in gas turbine propulsion units to subdivide the shaft of the gas producer. In such an arrangement, the shaft part coordinated to the compressor rotor is safely secured for common movement in the direction of rotation to the shaft part coordinated to the turbine rotor by means of a plug-in-type connection or plug-type coupling. The two shaft parts are clamped together in the axial direction by a separate anchoring or connecting rod which extends within the turbine shaft part, and which is threadably secured with the outer end thereof into the inner end of the compressor shaft part, i.e., from the side of the turbine. The axial clamping of the two shafts is finally accomplished by a threaded connection of the inner end of the connecting rod with the inner end of the turbine shaft part from the turbine side of the propulsion unit, even before the turbine wheels are secured to the flange of the turbine shaft part by means of bolts.

The known construction has the disadvantage that after balancing of the entire gas-producer rotor, the turbine wheels which are threadably secured to the flange of the turbine shaft part have to be removed again so that the inner threaded connection of the connecting rod with the turbine shaft part becomes accessible in order to enable the temporary separation of the two shaft parts for the subsequent separate installation of the compressor with its shaft part and the turbine shaft part into the propulsion unit housing.

The present invention has as its object the provision of an arrangement in which the compressor drive shaft is constructed in such a manner and arranged in such a manner within the propulsion unit housing that, upon balancing of the entire gas-producer rotor during subsequent installation thereof in the propulsion unit housing, the turbine wheels can remain on the shaft part to which they have been coordinated.

In order to accomplish this object, the present invention proposes to arrange the detachably provided axial connection between the compressor shaft part and the turbine shaft part on the side of the compressor and accessible from the outside.

In accordance with a further feature of the present invention, it is proposed to provide the shaft part coordinated to the compressor rotor as a hollow shaft, and the shaft part coordinated to the turbine rotor partly as a plug-in connector shaft having an outer extension which is guided through the hollow compressor shaft part whereby the outer end of the compressor shaft part and the outer end of the turbine shaft part are abuttingly connected in the axial direction.

The present invention provides on the outer end of the extension of the turbine shaft part rapidly installable means which, upon sliding the hollow compressor shaft part over the outer extension of the turbine shaft part, bring about a securing or fastening of the compressor shaft part in the axial direction.

A further feature of the present invention resides in providing one of the two shaft parts of the compressor drive shaft simultaneously as a connecting or tensioning rod. This may preferably be achieved by providing the extension of the turbine shaft part over a part of the length thereof as an expansible element.

Accordingly, it is an object of the present invention to provide a shaft assembly for a gas turbine drive unit which obviates the short-comings and inadequacies of the prior art constructions.

It is another object of the present invention to provide a compressor drive shaft assembly for gas turbine drive units consisting of two shaft parts which may be readily assembled and in which the detachable coupling is readily accessible from the outside thereof, particularly from the compressor side thereof.

Still a further object of the present invention resides in the provision of a shaft assembly for the compressor drive shaft of gas turbine drive units which permits an installation of the detachable connection between the shaft parts without the necessity of removal of those parts of the drive unit which have to be mounted prior to balancing the rotary parts thereof.

Still a further object of the present invention resides in the provision of a detachable connection between the two shaft parts of a compressor drive shaft in gas turbine drive units which permits installation and disassembly of the detachable connection without requiring removal of any other parts.

Figure 2:
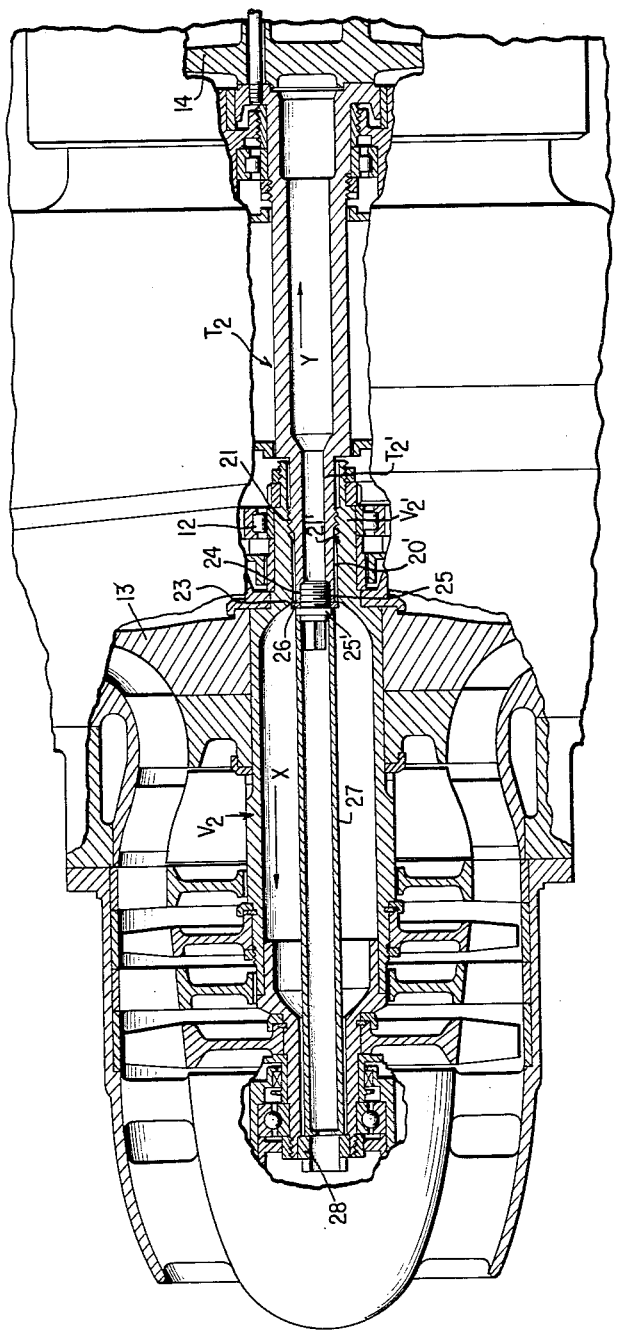

These and other objects, features and advantages of the present invention will become more obvious from the following description when taken in connection with the accompanying drawing which shows, for purposes of illustration only, two embodiments in accordance with the present invention, and wherein FIGURE 1 is an axial longitudinal cross section through the gas producer of a gas turbine propulsion unit with a first shaft arrangement in accordance with the present invention; and FIGURE 2 is also an axial longitudinal cross section through the gas producer of a gas turbine propulsion unit with a second shaft arrangement in accordance with the present invention.

Referring now to the drawing wherein like reference numerals are used throughout the various views and more particularly to FIGURE 1, the shaft of the gas producer, i.e., the compressor drive shaft illustrated therein consists of two individual shaft parts, namely the compressor shaft part $V_1$ and the turbine shaft part $T_1$. The compressor wheels 13 are mounted on the compressor shaft part $V_1$ which is provided as a hollow shaft and supported within the propulsion unit housing by means of a front bearing 11 and a center bearing 12. The turbine wheels 14 are secured to the flange 15 of the turbine shaft part $T_1$ which is inserted with its outer extension $T_{1'}$ into the hollow compressor shaft part $V_1$. The outer end 16 of the shaft projection $T_{1'}$ is provided with an external thread on which is threadably mounted a nut 29 by means of which is clamped a bushing 17 provided with a collar 17' against one shaft shoulder 18 whereby there is formed, in cooperation with the end face 19 of the compressor shaft part $V_1$, an abutment in the axial direction. The two shaft parts $V_1$ and $T_1$, are connected with each other in the direction of rotation in a form-locking manner by means of a plug-in or connector type coupling 20 which may consist of a spline and groove connection. The center portion of projection $T_{1'}$ is constructed as expandable element. Centering of the two shaft parts $V_1$ and $T_1$ with respect to each other is brought about by means of a centering collar 21 provided on the shaft projection $T_{1'}$ and with the aid of annular centering surface 21' provided on the inner surface of the compressor shaft part $V_1$.

During operation, an axial thrust is exerted on the compressor shaft part $V_1$ in the direction of the arrow X, while an axial thrust in the direction of arrow Y is exerted on the turbine shaft part $T_1$, the latter thrust being smaller than the first-mentioned thrust. The thrust Y which is advantageously absorbed by the expansible element T' as a result of its structural rigidity is transmitted to the compressor shaft part $V_1$ by means of the abutment 17', 19, while the existing thrust difference is absorbed by the outer bearing 11. On the side of the turbine, shaft part $T_1$ is additionally supported by an inner bearing 22. By the "suspension" of the turbine shaft part $T_1$ in the axial direction through abutment 17', 19, the axial thrust thereof is transmitted to the compressor shaft part $V_1$ so that only one of the three bearings 11, 12 and 22, namely bearing 11, need to be provided as a stationary bearing.

As shown in connection with the modified embodiment of FIGURE 2, the turbine shaft part $T_2$ extends only somewhat beyond the height or area of the center bearing 12. Within this area, the compressor drive shaft part $V_2$ is provided with a stepped portion 23. The outer projection $T_2'$ of the turbine shaft part $T_2$ is relatively short as to its length and is provided with an internal thread 24 into which a bolt 25 is threadably inserted which with its collar 25' supports an abutment disk 26 against the outer end face of the shaft projection $T_2'$, so that in cooperation with the stepped portion 23, an abutment in the axial direction is formed for the shaft part $T_2$. The coupling between the two shaft parts $V_2$ and $T_2$ in the direction of rotation is accomplished by a plug-in-type connection 20' such as a spline and groove connection and centering takes place with the aid of a centering collar or flange 21.

The bolt 25 is secured against becoming loose by means of a spacer bushing or sleeve 27 reaching to the outer end of the compressor shaft part $V_2$, this spacer bushing being pressed against the flange 25' in the axial direction by means of a threaded nut 28 which engages threadably within an internal thread provided at the outer end of the compressor shaft part $V_2$.

After the compressor shaft part $V_2$ has been installed in the compressor housing, the turbine shaft part $T_2$ is inserted with its outer end $T_2'$ into the shaft part $V_2$. Thereupon, the bolt 25 is screwed in with a long socket wrench and the spacer bushing 27 is installed thereupon.

While I have shown and described two embodiments in accordance with the present invention, it is understood that the same is not limited thereto but is susceptible of many changes and modifications with the spirit and scope thereof, and I therefore do not wish to be limited to the details shown and described herein but intend to cover all such changes and modifications as are encompassed by the scope of the appended claims.

I claim:

1. A compressor drive shaft in gas turbine propulsion units, comprising at least three bearings, two shaft parts, and means detachably connecting said two shaft parts with one another so as to be coupled with each other in the direction of rotation and centered with respect to each other, a turbine rotor and a compressor rotor, one of said shaft parts being coordinated to the turbine rotor and the other shaft part being coordinated to the compressor rotor, said two shaft parts being detachably connected with one another in the axial direction during assembly of said compressor drive shaft, said detachable axial connection means between said two shaft parts being so arranged and constructed as to be accessible from the outside from the side of the compressor, said other shaft part coordinated to the compressor rotor being constructed as hollow shaft and said one shaft part coordinated to the turbine rotor being constructed in part as a plug-in-type shaft having an extension extending at least partly through said other shaft part, the outer end of said extension projecting beyond the outer end of the compressor shaft part and being provided with threaded means, and means clampingly connecting the outer end of said one shaft part in axial abutting engagement including bushing means having a collar portion in engagement with said other shaft part, and a nut threadably engaging said threaded means to clampingly tightening said collar portion against a shoulder provided in said extension whereby said collar portion forms an abutment in the axial direction for said one shaft part.

2. A compressor drive-shaft in gas turbine propulsion units, comprising at least three bearings including a forward bearing, a center bearing, and a rear bearing, two shaft parts, and detachable axial connection means detachably connecting said two shaft parts with one another so as to be coupled with each other in the direction of rotation and centered with respect to each other, a turbine rotor and a compressor rotor, one of said shaft parts being connected to the turbine rotor and the other shaft part being connected to the compressor rotor and being of hollow construction, said two shaft parts being detachably connected with one another in the axial direction by said detachable axial connection means during assembly of said compressor drive shaft, centering means between said two shaft parts disposed substantially within the area of the center bearing including a centering collar on said one shaft part supported against the inner wall of said hollow other shaft part, said center bearing contacting the outer wall of said hollow other shaft part, said detachable axial connection means between said two shaft parts being so arranged and constructed as to be accessible from the outside from the side of the compressor, said one shaft part connected to the turbine rotor being constructed in part as a plug-in-type shaft having an extension provided with said centering collar and extending through said other shaft part, and means adjacent said forward bearing clampingly connecting an outer end portion of said extension with the outer end of said hollow other shaft part, said last-named means including a member having parts in axial abutting engagement with said outer end portion and said outer end, said detachable axial connection means comprising spline and groove means disposed in the region of said member.

3. A compressor drive-shaft for gas turbine propulsion units, comprising at least three bearings including a stationary forward bearing and movable center and rear bearings, two shaft parts, and detachable axial connection means comprising centering means and splined connecting means detachably connecting said two shaft parts with one another so as to be coupled with each other in the direction of rotation and centered with respect to each other, a turbine rotor and a compressor rotor one of said shaft parts being connected to the turbine rotor and the other shaft part being connected to the compressor rotor, said two shaft parts being detachably connected with one another in the axial direction by said detachable axial connection means during assembly of said compressor drive-shaft, said detachable axial connection means between said two shaft parts being so arranged and constructed as to be accessible from the outside from the side of the compressor, said other shaft part connected to the compressor rotor being constructed as hollow shaft and said one shaft part connected to the turbine rotor being constructed in part as a plug-in-type shaft having an outer extension extending through said other hollow shaft part, said extension having an outer end projecting beyond the outer end of said other shaft part, an abutment member on said first-named outer end, said second-named outer end terminating in an abutment face, and clamping means including a collar member and a nut member securing said one shaft part and said other shaft part in mutually fixed axial relationship, said collar member abuttingly engaging said abutment member and said abutment face, said clamping means being disposed adjacent said stationary forward bearing.

4. A compressor drive-shaft in gas turbine propulsion units, comprising three bearings including a stationary forward bearing and movable center and rear bearings, two shaft parts, and means detachably connecting said two shaft parts with one another so as to be coupled with each other in the direction of rotation and centered with respect to each other, a turbine rotor and a compressor rotor, one of said shaft parts being coordinated to the turibne rotor and the other shaft part being coordinated to the compressor rotor and being of hollow construction, said two shaft parts being detachably connected with one another in the axial direction during assembly of said compressor drive shaft, centering means between said two shaft parts disposed substantially within the area of the center bearing including a centering collar at said one shaft part supported against the inner wall of said hollow other shaft part, said means detachably connecting said two shaft parts being so arranged and constructed as to be accessible from the outside from the side of the compressor, said one shaft part coordinated to the turbine rotor being constructed in part as a plug-in-type shaft having an extension provided with said centering collar and extending at least partly through said other shaft part, the outer end of said extension projecting beyond the outer end of the said other shaft part and being provided with threaded means, means clampingly connecting the outer end of said one shaft in axial abutting engagement including bushing means having a collar portion in engagement with said other shaft part, and a nut threadably engaging said threaded means to clampingly tightening said collar portion against a shoulder provided in said extension whereby said collar portion forms an abutment in the axial direction for said one shaft part.

5. A construction and arrangement of the compressor drive-shaft in gas turbine propulsion units, comprising at least three bearings including a forward bearing, a center bearing, and a rear bearing, two shaft parts, and splined connecting means disposed within the area of the forward bearing for detachably connecting said two shaft parts with one another so as to be coupled with each other in the direction of rotation and centering means between said two shaft parts enabling the latter to be centered with respect to each other, a turbine rotor and a compressor rotor, one of said shaft parts being connected to the turbine rotor and the other shaft part being connected to the compressor rotor, said two shaft parts being detachably connected with one another in the axial direction by said splined connecting means during assembly of said compressor drive-shaft, said splined connecting means between said two shaft parts being so arranged and constructed as to be accessible from the outside from the side of the compressor, said other shaft part connected to the compressor rotor being constructed as hollow shaft and said one shaft part connected to the turbine rotor being constructed in part as a plug-in-type shaft having an outer extension extending through said other shaft part, an end portion of said extension extending outwardly beyond the outer end portion of said other shaft part, and abutment means comprising adjustable members disposed axially forward of said forward bearing for securing said first-named end portion and said outer end portion in mutually fixed axial relationship, said abutment means being located adjacent said splined connecting means.

6. A compressor drive shaft for gas turbine propulsion units, comprising at least three bearings including a forward bearing, a center bearing, and a rear bearing, said front bearing only being constructed as a fixed bearing, two shaft parts, and means detachably connecting said two shaft parts with one another in the axial direction during assembly thereof to effectively provide a mutual coupling in the direction of rotation and a centering with respect to each other, a turbine rotor and a compressor rotor, one of said shaft parts being connected to the turbine rotor and the other shaft part being connected to the compressor rotor, said means detachably connecting said two shaft parts being constructed and arranged to be accessible from the compressor side, said other shaft part connected to the compressor rotor being a hollow shaft, said one shaft part connected to the turbine rotor being constructed in part as a plug-in-type shaft having an outer extension extending through said other shaft part, the outer end portion of said extension extending outwardly beyond the outer end of said other hollow shaft part, said first-named means including a centering collar on the inner end portion of said outer extension engaging the inner wall of said hollow shaft, said center bearing contacting the outer circumference of said hollow shaft radially outwardly of said centering collar, and means comprising clamping members including a member abuttingly engaging outer end portions of said outer extension and said other shaft part in the region of said forward bearing for securing said outer end portions in axially fixed relationship with each other.

7. A compressor drive shaft for gas turbine propulsion units, comprising at least three bearings including a forward bearing, a center bearing, and a rear bearing, two shaft parts, and means detachably connecting said two shaft parts with one another so as to be coupled with each other in the direction of rotation and centered with respect to each other, a turbine rotor and a compressor rotor, one of said shaft parts being coordinated to the turbine rotor and the other shaft part being coordinated to the compressor rotor and being of hollow construction, centering means between said two shaft parts disposed essentially within the area of the center bearing including a centering collar secured to said one shaft part and supported against the inner wall of the other shaft of hollow construction, said means detachably connecting said two shaft parts being accessible from the outside from the compressor side, said shaft parts being connected so as to enable slight axial play therebetween, said one shaft part coordinated to the turbine rotor being constructed in part as a plug-in-type shaft having an extension provided with said centering collar and extending at least partly through said other shaft part, said extension having an outer end extending beyond the outer end of said other shaft part, means clampingly connecting said outer end in axial abutting engagement including bushing means having a collar portion in engagement with said other shaft part, said last-mentioned means being effective to transmit axial forces between said shaft parts whereby only the forward one of said three bearings need be constructed as a stationary bearing.

References Cited in the file of this patent
UNITED STATES PATENTS

| | | |
|---|---|---|
| 2,117,131 | Auger | May 10, 1938 |
| 2,648,491 | Wood | Aug. 11, 1953 |
| 2,680,001 | Batt | June 1, 1954 |
| 2,779,531 | Wheatley | Jan. 29, 1957 |
| 2,977,758 | Haworth et al. | Apr. 4, 1961 |
| 3,014,694 | Paul et al. | Dec. 26, 1961 |

FOREIGN PATENTS

| | | |
|---|---|---|
| 740,905 | Great Britain | Nov. 23, 1955 |